(12) United States Patent
Bohn et al.

(10) Patent No.: US 12,447,801 B2
(45) Date of Patent: Oct. 21, 2025

(54) ELECTRICAL ADAPTER

(71) Applicant: Mahle International GmbH, Stuttgart (DE)

(72) Inventors: Serge Bohn, Turkheim (FR); Guillaume Daudon, La Bourgonce (FR); Juan S. Garulo, Valencia (ES); Jean-Philippe Gries, Colmar (FR); Audrey Zahnd, Cernay (FR)

(73) Assignee: Mahle International GmbH (DE)

( * ) Notice: Subject to any disclaimer, the term of this patent is extended or adjusted under 35 U.S.C. 154(b) by 918 days.

(21) Appl. No.: 17/676,108

(22) Filed: Feb. 18, 2022

(65) Prior Publication Data

US 2022/0266658 A1 Aug. 25, 2022

(51) Int. Cl.
*B60H 1/22* (2006.01)
*B60H 1/00* (2006.01)
(Continued)

(52) U.S. Cl.
CPC ....... *B60H 1/2225* (2013.01); *B60H 1/00528* (2013.01); *H01R 13/719* (2013.01);
(Continued)

(58) Field of Classification Search
CPC .. H05B 1/0236; H01R 31/065; H01R 13/719; H01R 2201/26; B60H 1/2225; B60H 1/2215; B60H 1/00528; B60H 2001/26
See application file for complete search history.

(56) References Cited

U.S. PATENT DOCUMENTS

2002/0011484 A1* 1/2002 Beetz ................... H05B 1/0236
219/202
2004/0213867 A1* 10/2004 Kalantzis ............ B29C 45/1774
425/151
(Continued)

FOREIGN PATENT DOCUMENTS

DE 100 18 590 C1 11/2001
DE 10 2016 212029 A1 1/2018
(Continued)

OTHER PUBLICATIONS

Engllish abstract for DE-100 18 590.
English abstract for DE-10 2016 212029.
EP Search Report for EP-21158067, dated Aug. 5, 2021.

*Primary Examiner* — Thien S Tran
(74) *Attorney, Agent, or Firm* — Fishman Stewart PLLC

(57) ABSTRACT

An electrical adapter for electrically connecting a control unit of a heating device to an electric energy source and to an electrical signal source. The adapter may include a support, an electrical signal line, a first electrical supply line, a second electrical supply line, and a filter device. The signal line and the supply lines may be embedded in a plastic material of the support. Ends of the signal line may merge into a signal input connection and into a signal output connection. Ends of the supply lines may merge into a first and second electrical supply input connection and into a first and second electrical supply output connection. The filter device may be configured to filter an electric supply current conducted via the supply lines. The filter device may include a first and second electrical filter connection via which the filter device is electrically connected to the supply lines.

20 Claims, 2 Drawing Sheets

(51) Int. Cl.
  *H01R 13/719* (2011.01)
  *H01R 31/06* (2006.01)
  *H05K 1/02* (2006.01)
(52) U.S. Cl.
  CPC ......... *H01R 31/065* (2013.01); *H05K 1/0201* (2013.01); *H01R 2201/26* (2013.01)

(56) References Cited

U.S. PATENT DOCUMENTS

2012/0193339 A1* 8/2012 Adachi .................. F24H 1/009
  219/202
2020/0307354 A1 10/2020 Gogmos et al.

FOREIGN PATENT DOCUMENTS

EP   0 918 373 A2   5/1999
EP   2 375 854 A1   10/2011

\* cited by examiner

ELECTRICAL ADAPTER

CROSS-REFERENCE TO RELATED APPLICATIONS

This application claims priority to European Patent Application No. EP 21158067.5, filed on Feb. 19, 2021, the contents of which is hereby incorporated by reference in its entirety.

TECHNICAL FIELD

The present invention relates to an electrical adapter for connecting a control unit of a heating device having an electrical energy source and having an electrical signal source.

BACKGROUND

For the controlled generation of heat, electrical heating devices for motor vehicles have been equipped with control units for some time. Such a control unit typically comprises an electronic control system, which is accommodated in a housing interior of an electronic housing. On the control unit, an electrical adapter is often present to which the electronic housing is fastened and which electrically and mechanically connects the electronic control system to an electrical signal connection and to an electrical supply connection that is separately from the former. By way of the signal connection of the adapter, the control unit or its electronic control system can be electrically connected to an electrical signal source and via the supply connection of the adapter to an electrical energy source.

In the process, it is generally required to electrically filter the electric supply current flowing from the electric energy source to the control unit, in order to remove or at least dampen electric current peaks and other high-frequency components from the supply current. In this way, malfunctions in the electronic control system are avoided or such interferences are at least counteracted. This results in an improved operating reliability of the control unit.

Typically, the electrical filtration of the electric supply current takes place using commercially available filters which are typically available as a unit and can be directly installed in the electronic control system, in particular on a circuit board, on which the components of the electronic control system are arranged.

Here it proves to be disadvantageous that the installation space in the region of the electronic control system that is available, in particular on the said circuit board, is generally greatly limited. Thus, when a filter device as a unit is mounted on the circuit board, this installation space is not available for other electronic or electrical elements of the electronic control system.

SUMMARY

It is therefore an object of the present invention to create an improved embodiment for an electrical adapter and for a control unit having such an electrical adapter, which takes into account the above mentioned problems.

This object is solved through the subject matter of the independent claim(s). Preferred embodiments are the subject matter of the dependent patent claim(s).

Accordingly, the basic idea of the invention is to integrate a filter device for filtering an electric supply current for a control unit of a heating device not directly in the electronic control system of the control unit but in the electrical adapter mentioned at the outset, via which the electronic control system can be electrically connected to an external electric energy source.

In this way, the installation space that is available in the electronic control system only to a limited degree is not occupied by the said filter device. The arrangement of the filter device in the electrical adapter additionally has the advantage that the filter device can be arranged at a spatially short distance from the electrical supply lines via which the electronic control system is connected to the external electric energy source. In this way, an effective filtering effect of the filter device is ensured. A further advantage consists in that during the construction of the electronic control system installation space for the said filter device can be left entirely out of consideration.

An electrical adapter according to the invention serves for electrically connecting a control unit of a heating device, in particular of a motor vehicle, both to an electric energy source and also to an electrical signal source. Furthermore, the adapter comprises a support of an electrically insulating plastic material. The adapter also comprises at least one electrical signal line for the electrical signal transmission, wherein this signal line is embedded in the plastic material of the support and at one end merges into an electrical signal input connection for the electrical and mechanical connecting to the electrical signal source and on the other end into a signal output connection for the electrical and mechanical connection to an electronic control system of the control unit. In a further development of the invention, two or more such signal lines can also be provided. Furthermore, the adaptor comprises a first and a second electrical supply line for the electric energy transmission from an external electric energy source to the electronic control system of the control unit. Like the at least one signal line, the two electrical supply lines are also embedded in the plastic material of the support. The two electrical supply lines each merge at one end into a first and second electrical supply input connection for the electrical and mechanical connection to the electric energy source and on the other end into a first and second electrical supply output connection for the electrical and mechanical connection to an electronic control system of the control unit. According to the invention, the electrical adaptor comprises a filter device arranged on the support for filtering an electric supply current conducted via the electrical supply lines. The electrical filter device comprises a first electrical filter connection, which is electrically connected to the first electrical supply line and comprises a second electrical filter connection which is electrically connected to the second electrical supply line.

Preferably, the filter device is designed as an electrical low-pass or follows at least the operating principle of such an electrical low-pass. Practically, the filter device as the electrical/electronic element bringing about the filtration has at least an electrical capacitance. It is to be understood that other electrical or/and electronical elements can also be used as part of the filter device. Such a low-pass filter is commercially available in different configurations so that the filter device most suitable for the respective application case can be application-specifically selected and installed in the electrical adapter according to the invention.

Practically, the two filter connections are each electrically connected to the respective electrical supply line in an integrally bonded manner by means of a soldered connection or by means of a welded connection, in particular by means of a resistance-welded connection. Such a soldered connection or welded connection can be easily realised technically speaking, so that the assembly of the electrical adapter according to the invention can also take place in a simple manner. This results in cost advantages during the manufacture of the adapter.

In a further preferred embodiment, the filter device is arranged on the support adjacently to the two electrical supply lines, preferably at a distance of maximally 5 mm. In this way, a particularly good filtering effect is achieved.

According to another preferred embodiment, the two filter connections project out of a filter housing of the filter device in which the electrical/electronic elements of the filter device are arranged. Such a filter connection can be in particular a pin or similar of an electrically conductive material, in particular of a metal. By contrast, an electrically insulating material such as plastic is possible as material for the filter housing. In this embodiment, the two filter connections are electrically connected with a connection end facing away from the filter housing to the respective electrical supply line. An extension length of at least one of the two filter connections between the associated electrical supply line and the filter housing amounts to maximally 5 mm. By way of this, a high-quality filtration of the electric supply current is ensured.

According to an advantageous further development of the invention, a distance between the filter housing and the one of the two electrical supply lines, that is arranged nearer to the filter housing than the other electrical supply line, amounts to maximally 5 mm. In this way, a high-quality filtration of the electric supply current is also ensured.

According to a further advantageous further development, the one signal line comprises or is an electrical current rail. In this way, a high transmission quality of the electrical signals transmitted by means of the signal line can be ensured. Obviously, such a signal rail can be provided for each individual signal line of the electrical adapter according to the invention. Alternatively or additionally, the first or/and second electrical supply line also comprises or is such an electric current rail in this further development. This allows conducting high electric supply currents from the external electric energy source via the electrical adapter according to the invention to the electronic control system of the control unit, in particular in a low-loss manner.

Practically, the support of the electrical adapter can be formed in one part. Thus, the electrical adapter is a particularly simple design structure and can thus also be produced in a particularly simple manner. This has an advantageous effect on the manufacturing costs of the electrical adapter and thus also on the manufacturing costs of the control unit using this adapter.

Alternatively to a one-part design, the support can also be designed in two parts with a first and a second support part. In this version, the two electrical supply lines are preferably arranged on the first support part and the at least one signal line on the second support part. This makes possible a greater flexibility concerning the technical construction of the electrical adapter. In particular, a modular construction is possible, in the case of which different designs relating to the electrical supply lines and the at least one signal line can be combined with one another.

Particularly practically, the filter device is at least partly overmoulded by the plastic material of the support. The consequence is that the filter device is permanently fixed on the support in a stable manner. This measure is also accompanied by a particularly simple construction of the electrical adapter which has an advantageous effect on the manufacturing costs of the adapter.

According to an advantageous further development, the signal input connection and the two supply input connections are located opposite one another along a main direction. The signal output connection and the two supply output connections in this further development are arranged along a sub-direction running perpendicularly to the main direction offset relative to the signal input connection and the two supply input connections and additionally next to one another along the main direction. This further development makes possible a space-saving electrical connection of the electronic control system to the adapter, since the output connections of the two electrical supply lines and of the at least one signal line are arranged directly next to one another.

Furthermore, the invention relates to a control unit for a heating device of a motor vehicle. The control unit comprises an electronic housing which surrounds a housing interior. Furthermore, the control unit comprises an adapter according to the invention introduced above. The advantages of the electrical adapter according to the invention explained above therefore apply also to the control unit according to the invention. In the case of the control unit according to the invention, the support of the adapter forms a part of the electronic housing of the control unit. Besides the support, the control unit also comprises an electronic control system for the heating device of a motor vehicle arranged in the housing interior. This electronic control system is electrically connected to the two supply output connections and the at least one signal output connection of the adapter.

In a further preferred embodiment of the control unit according to the invention, the same, besides the support of the electrical adapter, comprises at least one further housing part, preferentially exactly one further housing part, which completes the support to the electronic housing. By way of this, the electronic housing can be flexibly adapted to different configurations of the electronic control system of the control unit.

Particularly preferably, the filter device is detachably fastened to the further housing part preferentially by means of a screw or clip connection. This measure allows a stable fixing of the filter device on the electronic housing and in the housing interior. In addition to this, the filter device, because of the detachable fastening, can be easily removed from the housing again when for example a defective specimen of the filter device is to be replaced with a functional replacement part. In this version, the overmoulding of the filter device with the plastic material of the support proposed above can be dispensed with, which results in further cost advantages.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
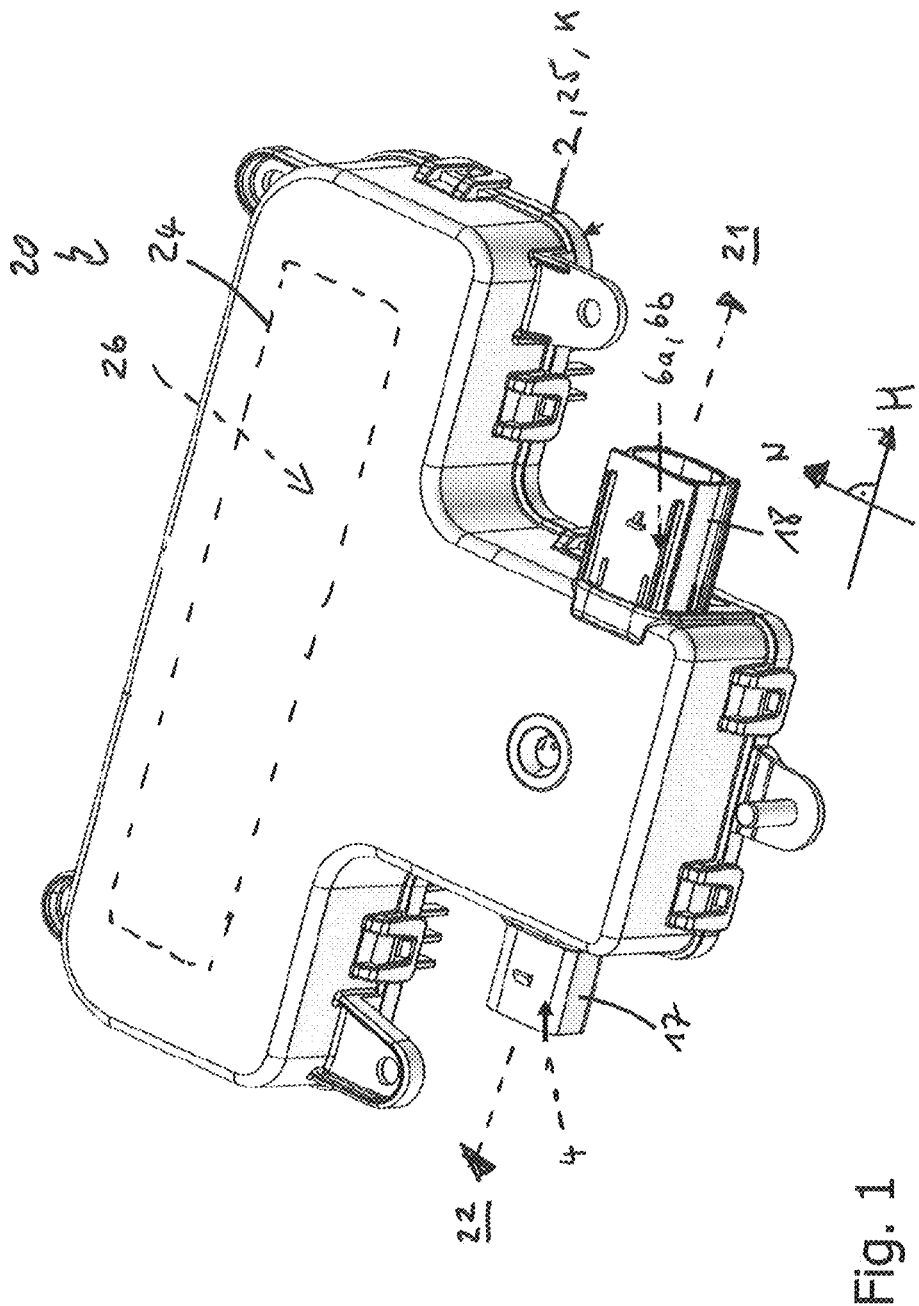
FIG. 1 shows, in a perspective representation, an example of a control unit of an electric heating device, which is equipped with an electrical adapter.

In FIG. 1, an example of a control unit 20 for a heating device of a motor vehicle according to the invention is shown in a perspective representation. The control unit 20 comprises an electronic housing 25, which surrounds a housing interior 26. In the housing interior 26, an electrical adapter 1 (only partly noticeable in FIG. 1) according to the invention having a support 2, which forms part of the electronic housing 25, is arranged. Apart from this, an electronic control system 24 of the control unit 20 which is not shown in more detail is arranged in the housing interior 26. An electronic control system 24 of the control unit 20, which is not visible in the representation of FIG. 1 and therefore indicated by means of a dashed frame, is arranged in the housing interior 26.

As illustrated by FIG. 1, the electronic housing 25 comprises exactly one further housing part 23, which completes the support 2 to form the electronic housing 25. According to FIG. 1, the filter device 10 can be detachably fastened to the further housing part 23, preferentially by means of a screw or clip connection. In versions of the example which are not shown, two or more such further housing parts 23 can be provided.

Figure 2:
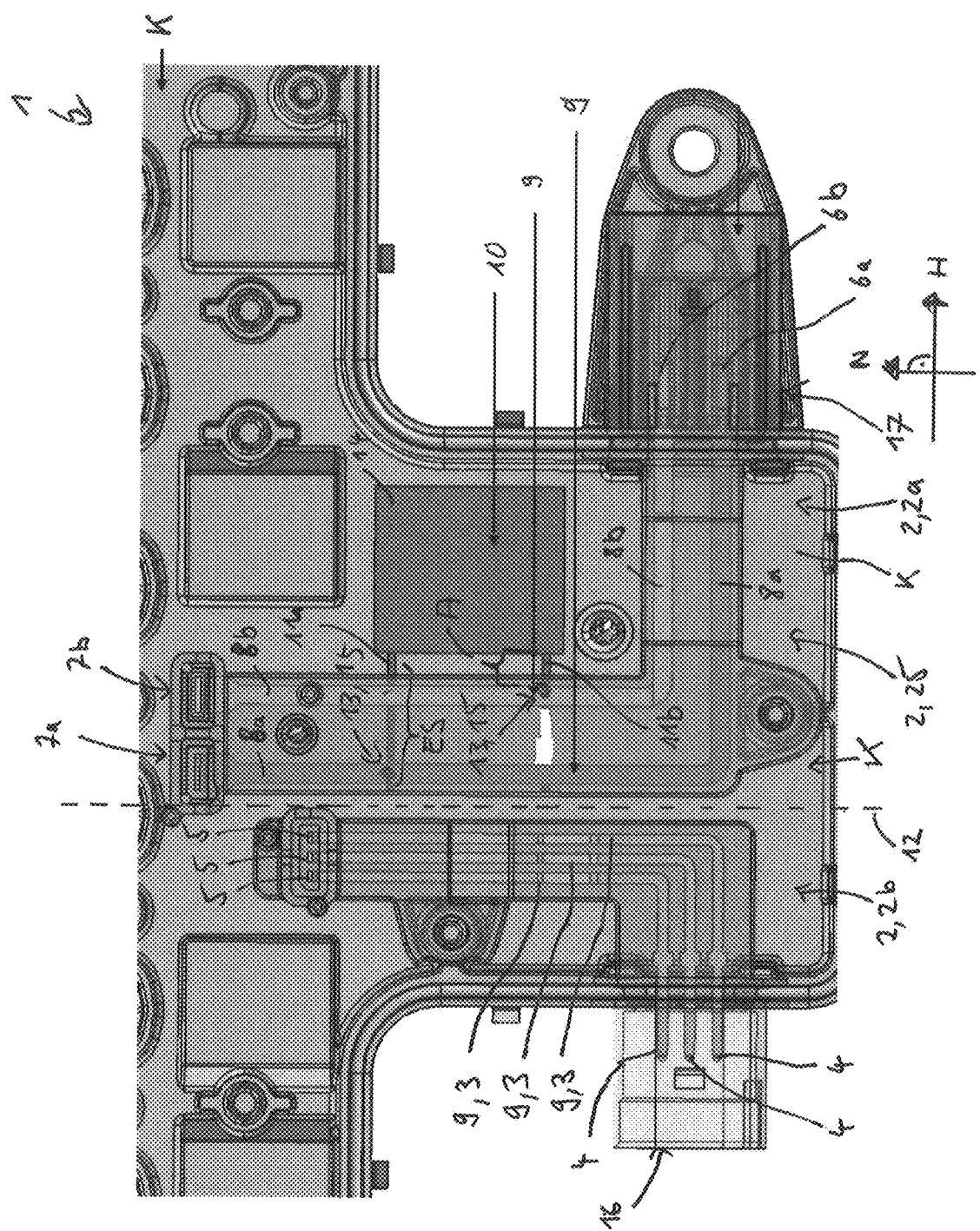
FIG. 2 shows, exemplarily, the electrical adapter according to the invention in a plan view.

FIG. 2 shows exemplarily the electrical adapter 1 according to the invention in a plan view. The electrical adapter 1 serves for electrically connecting the control unit 20 to an external electric energy source 21 (only schematically indicated in FIG. 2) and to an external electrical signal source 22 (only schematically indicated in FIG. 2).

The adapter 1 comprises a support 2 of an electrically insulating plastic material K. In the exemplary scenario of FIG. 2, the adapter 1 additionally comprises three electrical signal lines 3, which are arranged at a distance from one another and which are embedded in the plastic material K of the support 2 and, at one end each merge into an electrical signal input connection 4 for the electrical and mechanical connection to an electrical signal source 22 and on the other end into a signal output connection 5 for the electrical and mechanical connection to an electronic control system 24 of the control unit 20.

Furthermore, the electrical adapter 1 comprises a first and a second electrical supply line 8a, 8b for the electric energy transmission from the electric energy source 21 to the control unit 20. The second electrical supply line 8b can assume the function electrical earth line. The two supply lines 8a, 8b are also embedded in the plastic material K of the support 2 and merge each at one end into a first and second electrical supply input connection 6a, 6b for the electrical and mechanical connection to the electric energy source 21 and on the other end into a first and second electrical supply output connection 7a, 7b for the electrical and mechanical connection to the electronic control system 24 of the control unit 20. The electronic control system 24 of the control unit 20 is electrically connected to the two supply output connections 7a, 7b and the three signal output connections 5.

In the example of the figures, the signal input connections 4 and the two supply input connections 6a, 6b lie opposite one another along a main direction H. In this further development, the signal output connections 5 and the two supply output connections 7a, 7b are arranged along a sub-direction N running perpendicularly to the main direction H laterally offset relative to the signal input connection 4 and the two supply input connections 6a, 6b and are additionally arranged along the main direction H next to one another.

The signal input connections 4 and the two supply input connections 6a, 6b can be arranged in a respective connector housing 16, 17 of plastic.

The three signal lines 3 and the two electrical supply lines 8a, 8b can each comprise an electrical current rail 9 of a metal.

Furthermore, the adapter 1 comprises a filter device 10 arranged on the support 2 for filtering an electric supply current conducted via the electrical supply lines 8a, 8b. The filter device 10 is designed as a low-pass and for this purpose comprises, as the electrical/electronic element bringing about the filtration, at least one electrical capacitance (not shown). The electrical filter device 10 comprises a first electrical filter connection 11a, which is electrically connected to the first electrical supply line 8a. The electrical filter device 10 additionally comprises a second electrical filter connection 11b, which is electrically connected to the second electrical supply line 8b.

As is schematically indicated in FIG. 2, the two filter connections 11a, 11b are each electrically connected to the respective electrical supply line 8a, 8b by means of a welded connection 13, in particular by means of a resistance welded connection. Alternatively to such a welded connection 13, a soldered connection is also possible. The filter device 10 can be at least partly overmoulded by the plastic material K of the support 2 (not shown).

As illustrated by the plan view on the support 2 of the adapter 1, the filter device 10 is arranged on the support 2 adjacently to the two electrical supply lines 8a, 8b at a distance of maximally 5 mm. A distance A between the filter housing 14 and the one of the two electrical supply lines 8a, 8b that is arranged nearer to the filter housing 14 than the other supply line 8b, 8a practically amounts to maximally 5 mm.

The two filter connections 11a, 11b of the filter device 10 can each be formed as pin or the like of an electrically conductive material, in particular of a metal and according to the representation of FIG. 2, project out of a filter housing 14 of the filter device 10, in which the already mentioned electrical/electronic elements of the filter device 10 (not shown) are arranged. The two filter connections 11a, 11b are each electrically connected to the associated electrical supply line 8a, 8b with a connection end 15 facing away from the filter housing 14. Practically, an extension length ES of at least one of the two filter connections 11a, 11b between the associated electrical supply line 11a, 11b and the filter housing 14 amounts to maximally 5 mm.

In the exemplary scenario, the support 2 is formed in one part. However, a two-part design of the support 2 is also possible, wherein the two electrical supply lines 8a, 8b are then practically arranged on a first support part 2a and the three signal lines 3 on a second support part 2b. The latter version with two support parts 2a, 2b is not explicitly shown in FIG. 2. However, by means of a virtual separating line 12 it is indicated how the support 2 can be divided into two support parts 2a, 2b as specified above concerning the arrangement of the signal and supply lines 3, 8a, 8b.

The invention claimed is:

1. An electrical adapter for electrically connecting a control unit of a heating device to an electric energy source and to an electrical signal source, comprising:

a support composed of an electrically insulating plastic material;

at least one electrical signal line for electrical signal transmission, the at least one electrical signal line embedded in the plastic material of the support, the at least one electrical signal line merging into an electrical signal input contact at one end for electrical connection to the electrical signal source and, at another end, merging into a signal output contact for electrical connection to an electronic control system of the control unit;

a first electrical supply line and a second electrical supply line for electric energy transmission, the first electrical supply line and the second electrical supply line embedded in the plastic material of the support, the first electrical supply line and the second electrical supply line merging into a first electrical supply input connection and a second electrical supply input connection at one end for electrical connection to the electric energy source and, at another end, merging into a first electrical supply output connection and a second electrical supply output connection for electrical connection to the electronic control system;

a filter arranged on the support for filtering an electric supply current conducted via the first electrical supply line and the second electrical supply line; and wherein the filter includes (i) a first electrical filter connection via which the filter is electrically connected to the first electrical supply line and (ii) a second electrical filter connection via which the filter is electrically connected to the second electrical supply line.

2. The electrical adapter according to claim 1, wherein the filter is configured as a low-pass and has at least one electrical capacitance as an electric/electronic element providing the filtration.

3. The electrical adapter according to claim 1, wherein the first electrical filter connection and the second electrical filter connection are each connected to the respective electrical supply line via at least one of a soldered connection and a welded connection.

4. The electrical adapter according to claim 1, wherein the filter is arranged on the support adjacently to the first electrical supply line and the second electrical supply line.

5. The electrical adapter according to claim 1, wherein:
the first electrical filter connection and the second electrical filter connection project from a filter housing of the filter;
at least one electrical/electronic element is arranged in the filter housing;
the first electrical filter connection and the second electrical filter connection, with a connection end facing away from the filter housing, are electrically connected to the respective electrical supply line; and
an extension length of at least one of the first electrical filter connection and the second electrical filter connection between the respective electrical supply line and the filter housing is 5 mm or less.

6. The electrical adapter according to claim 5, wherein a distance between the filter housing and a closer of the first electrical supply line and the second electrical supply line is 5 mm or less.

7. The electrical adapter according to claim 1, wherein at least one of the at least one signal line, the first electrical supply line, and the second electrical supply line includes an electric current rail composed of a metal.

8. The electrical adapter according to claim 1, wherein the support part is formed in one, singular part.

9. The electrical adapter according to claim 1, wherein the filter is at least partly overmoulded by the plastic material of the support.

10. The electrical adapter according to claim 1, wherein:
the electrical signal input contact is disposed opposite the first electrical supply input connection and the second electrical supply input connection along a main direction; and
the signal output contact, the first electrical supply output connection, and the second electrical supply output connection, along a sub-direction extending perpendicularly to the main direction, are arranged laterally offset relative to the electrical signal input contact, the first electrical supply input connection, and the second electrical supply input connection and, along the main direction, are arranged next to one another.

11. A control unit for a heating device of a motor vehicle, comprising:
an electronic housing surrounding a housing interior;
an electrical adapter according to claim 1;
wherein the support of the adapter forms a part of the electronic housing; and
wherein the electronic control system is arranged in the housing interior and is electrically connected to the first electrical supply output connection, the second electrical supply output connection, and the signal output contact.

12. The control unit according to claim 11, further comprising at least one further housing part that, together with the support, defines the electronic housing.

13. The control unit according to claim 12, wherein the filter is detachably fastened to the further housing part.

14. The control unit according to claim 12, wherein the filter is detachably fastened to the further housing part via a screw connection.

15. The control unit according to claim 12, wherein the filter is detachably fastened to the further housing part via a clip connection.

16. The electrical adapter according to claim 1, wherein the first electrical filter connection and the second electrical filter connection are each connected to the respective electrical supply line via a resistance welded connection.

17. The electrical adapter according to claim 1, wherein the filter is arranged on the support adjacently to the first electrical supply line and the second electrical supply line at a distance of 5 mm or less.

18. The electrical adapter according to claim 1, wherein:
the support part is formed in two parts;
the first electrical supply line and the second electrical supply line are arranged on a first support part of the support; and
the at least one signal line is arranged on a second support part of the support.

19. The electrical adapter according to claim 18, wherein the filter is at least partly overmoulded by the plastic material of the first support part.

20. An electrical adapter for a heating device, comprising:
a support composed of an electrically insulating plastic material;
an electrical signal input contact for electrical connection to an electrical signal source;
a signal output contact for electrical connection to an electronic control system of a heating device control unit;
at least one electrical signal line embedded in the plastic material of the support, a first end of the at least one electrical signal line merging into the electrical signal input contact, a second end of the at least one electrical signal line merging into the signal output contact;

a first electrical supply input connection and a second electrical supply input connection for electrical connection to an electric energy source;

a first electrical supply output connection and a second electrical supply output connection for electrical connection to the electronic control system;

a first electrical supply line embedded in the plastic material of the support, a first end of the first electrical supply line merging into the first electrical supply input connection, a second end of the first electrical supply line merging into the first electrical supply output connection;

a second electrical supply line embedded in the plastic material of the support, a first end of the second electrical supply line merging into the second electrical supply input connection, a second end of the second electrical supply line merging into the second electrical supply output connection;

a filter for filtering an electric supply current conducted via the first electrical supply line and the second electrical supply line; and wherein the filter is arranged on the support and includes (i) a first electrical filter connection electrically connected to the first electrical supply line and (ii) a second electrical filter connection electrically connected to the second electrical supply line.

\* \* \* \* \*